(No Model.) 2 Sheets—Sheet 1.

H. F. URIE.
CORN HARVESTING MACHINE.

No. 320,416. Patented June 16, 1885.

WITNESSES:
A. C. Eader
John E. Morris.

INVENTOR:
Henry F. Urie

By Chas. B. Mann
Attorney.

N. PETERS, Photo-Lithographer, Washington, D. C.

(No Model.)

2 Sheets—Sheet 2.

H. F. URIE.
CORN HARVESTING MACHINE.

No. 320,416.

Patented June 16, 1885.

WITNESSES:
A. C. Eader.
John E. Morris.

INVENTOR:
Henry F. Urie

By Chas B. Mann
Attorney.

UNITED STATES PATENT OFFICE.

HENRY F. URIE, OF CHESTERTOWN, MARYLAND.

CORN-HARVESTING MACHINE.

SPECIFICATION forming part of Letters Patent No. 320,416, dated June 16, 1885.

Application filed July 1, 1884. (No model.)

*To all whom it may concern:*

Be it known that I, HENRY F. URIE, a citizen of the United States, residing at Chestertown, in the county of Kent and State of Maryland, have invented certain new and useful Improvements in Corn-Harvesting Machines, of which the following is a specification.

My invention relates to a corn-harvester; and it consists in certain features of construction and combinations of parts hereinafter described and claimed.

Figure 1:
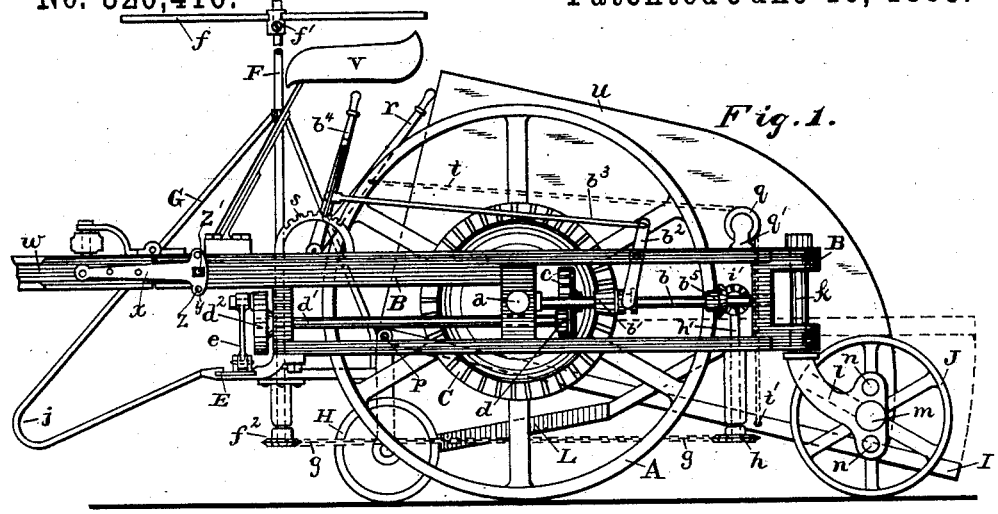
Figure 2:
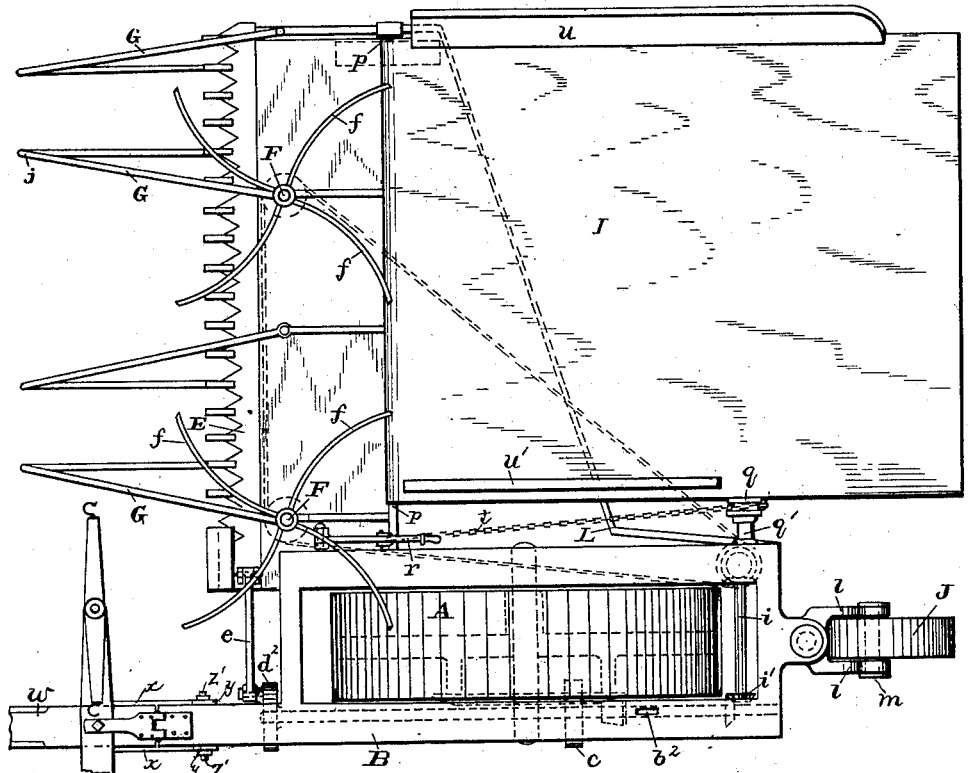
Figure 3:
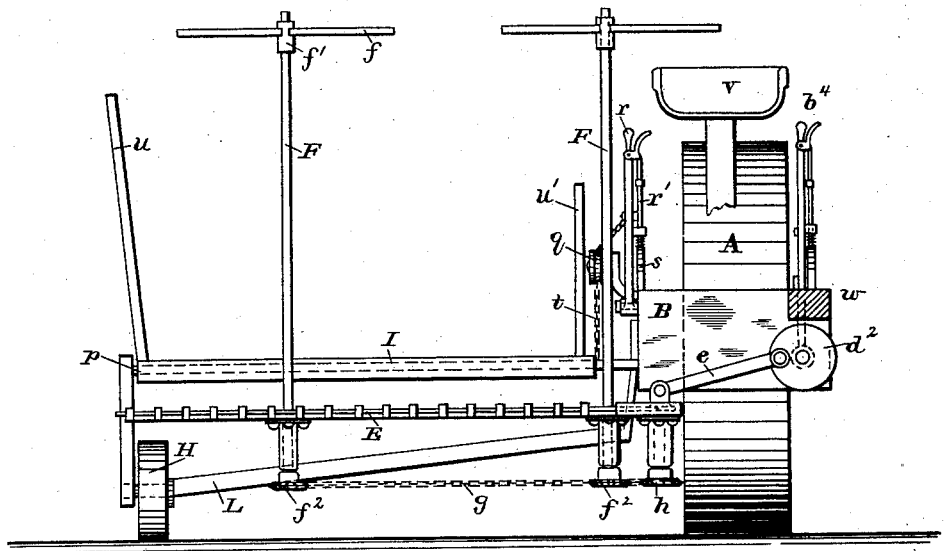

In the drawings hereto annexed, Figure 1 is a side elevation of the machine. Fig. 2 is a top view of the same. Fig. 3 is a front view of the same.

The letter A designates the main wheel; $a$, its axle, in bearings on the frame B. A cog-wheel, C, is attached to the side of the main wheel.

A shaft, $b$, has bearings in the frame and extends fore and aft, and has a pinion, $b'$, that is adapted to slide endwise by the well-known groove-and-feather device, and thereby gear with the cog-wheel C or disengage from it. A lever, $b^2$, rod $b^3$, and hand-lever $b^4$ comprise the mechanism for shifting the said pinion. The shaft $b$ carries an internal gear-wheel, $c$, and a small pinion, $d$, on another shaft, $d'$, engages with the said gear-wheel. At the front end of the shaft $d'$ is a crank-head, $d^2$. A pitman-rod, $e$, on the crank-head drives the cutter-bar E with great rapidity.

The cutter-bar projects at one side only of the draft-tongue, and is of length sufficient to take two rows of standing stalks at once. Two vertical shafts, F, are mounted back of the cutter. Each has reel-arms $f$ attached to a hub, $f'$, which is adjustable up and down. One reel-shaft is near the frame B, and takes effect on the stalks of one row, and the other reel-shaft is far enough removed from the first one to take effect on the stalks of the second row, as will be readily understood.

The reels are driven by the following mechanism: The lower end of each shaft F has a sprocket-wheel, $f^2$. One chain, $g$, passes over both sprocket-wheels, and also over a sprocket-wheel, $h$, on the lower end of a vertical shaft, $h'$, located at the rear of the frame B. This shaft has a bevel-wheel, which engages with a like wheel on one end of a horizontal shaft, $i$, which has at its other end another wheel, $i'$, which engages with a wheel, $b^5$, on the rear end of the shaft $b$. The two reels, therefore, are driven through the medium of the wheels, one chain, $g$, and shaft $b$.

At the front are two rods, G, for each row, which comprise gatherers to raise stalks, which may be bent down, and direct them to the reels and cutter. The gatherers project before the cutter, and the front end, $j$, is close to the ground, and from thence incline upward and back, as shown. Each reel-shaft may be braced by one of these rods.

A small side wheel, H, supports the projecting end of the cutter-bar and one side of the platform I.

A caster-wheel, J, has its shank $k$ pivoted in the rear end of the frame B. The bifurcated standard $l$, which straddles the wheel J, has holes $n$ arranged in line one above the other. The bolt $m$ is removable and comprises the axle of the wheel, and may be shifted to holes $n$, higher or lower.

As the axis $a$ of the main wheel is intermediate of the cutter and caster-wheel, the rear end of the frame may be lowered or raised, which has the effect to raise or lower the cutter-bar E at the front. The same adjustment of the rear end of the frame acts also to change the height of the tilting platform I.

A brace-bar, L, has one end attached to the side of the frame, and extends across and below the platform, and its other end is attached to the axis of the side wheel, H. This brace-bar gives rigidity to the parts.

The platform I has hinges or pivots $p$ at its front end, whereby the rear end may tilt. The front end of the platform, as seen in Figs. 1 and 3, is elevated, or has position higher than the cutter-bar. Thereby the rear end may drop or tilt down, as seen in Fig. 1, without striking against the brace-bar L.

A pulley, $q$, is supported by a bracket, $q'$, at the side and near the rear of the frame. A lever, $r$, at the front of the frame, has a bolt, $r'$, which engages with a segment shaped rack, $s$, whereby the lever is held. A chain, $t$, has one end attached at $t'$ to the platform, passes over the pulley $q$, and has the other end attached to the said lever $r$. It will thus be seen the platform may be raised or dropped by moving the lever.

The cut cornstalks fall on the platform, and may be carried thereon until a sufficient number have accumulated to form a bundle, when, upon letting the platform drop, the ends of the stalks will rest on the ground, and they will be dragged off as the machine moves forward.

The platform has two upright sides, $u\ u'$, which direct the cornstalks onto the platform and keep them there until they are dumped.

A seat, $v$, for the driver is in position wherefrom the two levers may be reached.

The letter $w$ designates the draft-tongue.

To permit the front of the frame to lower without affecting the tongue $w$, the tongue may be jointed, as shown in Figs. 1 and 2, and on each side of the joint have attached an iron, $x$, having a T-shaped end, $y$, provided with holes $z$, while a bolt, $z'$, passes through one of the holes and tongue.

From the foregoing the operation of the machine will be readily understood.

Having described my invention, I claim and desire to secure by Letters Patent of the United States—

1. A corn-harvester having a cutter-bar, E, a reel mounted on a vertical shaft, and gatherer-rods G, projecting before the cutter and bracing the reel-shaft, as set forth.

2. A corn-harvester having in combination a frame, B, having at its rear a pulley, $q$, and carried by a main wheel, A, a side wheel, H, a cutter-bar, E, a platform, I, having its front end hinged higher than the said cutter-bar, a brace-bar, L, extending from the said frame to the side wheel below the hinged platform, a lever, $r$, at the front of the frame, and a chain, $t$, having one end attached to the lever and the other to the platform, and passing over the said pulley $q$, as set forth.

In testimony whereof I affix my signature in presence of two witnesses.

HENRY F. URIE.

Witnesses:
VACHEL BURGESS,
JOHN D. URIE.